United States Patent
Saito et al.

(10) Patent No.: US 8,425,798 B2
(45) Date of Patent: Apr. 23, 2013

(54) LIQUID CRYSTAL POLYESTER COMPOSITION, REFLECTIVE PLATE AND LIGHT-EMITTING DEVICE

(75) Inventors: Shintaro Saito, Tsukuba (JP); Ryo Miyakoshi, Tsukuba (JP); Mitsuo Maeda, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 99 days.

(21) Appl. No.: 13/190,534

(22) Filed: Jul. 26, 2011

(65) Prior Publication Data

US 2012/0026741 A1  Feb. 2, 2012

(30) Foreign Application Priority Data

Jul. 30, 2010  (JP) .................................. 2010-171899

(51) Int. Cl.
 *C09K 19/52* (2006.01)
 *C09K 19/54* (2006.01)
 *F21V 7/22* (2006.01)

(52) U.S. Cl.
 USPC .............. 252/299.01; 252/299.5; 362/296.02; 362/341

(58) Field of Classification Search ............. 252/299.01, 252/299.5; 362/296.02, 341
 See application file for complete search history.

(56) References Cited

U.S. PATENT DOCUMENTS

| | | | | |
|---|---|---|---|---|
| 5,529,716 | A | * | 6/1996 | Nomura et al. .......... 252/299.01 |
| 2004/0212295 | A1 | * | 10/2004 | Yin Chua et al. ............. 313/503 |
| 2010/0053972 | A1 | * | 3/2010 | Nakayama ............... 362/296.01 |
| 2012/0097894 | A1 | * | 4/2012 | Nakayama et al. ........ 252/299.5 |
| 2012/0235089 | A1 | * | 9/2012 | Nakayama et al. ........ 252/299.5 |
| 2012/0235559 | A1 | * | 9/2012 | Nakayama et al. ........... 313/498 |

OTHER PUBLICATIONS

English abstract for JP 2000044793, 2000.*
English abstract for JP 2007320996, 2007.*

* cited by examiner

*Primary Examiner* — Shean C Wu
(74) *Attorney, Agent, or Firm* — Panitch Schwarze Belisario & Nadel LLP

(57) ABSTRACT

The present invention provides a composition comprising a liquid crystal polyester, a white pigment and a glass fiber bundle obtained by bundling glass fibers using a sizing agent comprising a polyurethane having a polyester polyol unit and at least one of an aliphatic diisocyanate unit or an alicyclic diisocyanate unit, wherein the polyester polyol unit is a polyol unit having an aliphatic polyhydric alcohol unit and at least one of an aliphatic polybasic acid unit or an alicyclic polybasic acid unit. The liquid crystal polyester composition can provide a reflective plate having a high reflectivity.

12 Claims, No Drawings

LIQUID CRYSTAL POLYESTER COMPOSITION, REFLECTIVE PLATE AND LIGHT-EMITTING DEVICE

BACKGROUND OF THE INVENTION

1. Field of the Invention

The present invention relates to a liquid crystal polyester composition comprising a liquid crystal polyester, a white pigment and a glass fiber bundle.

2. Description of the Related Art

As a reflective plate of an LED (light-emitting diode) light-emitting device, a reflective plate made of a resin is often used because of its excellent processability and lightweight properties. In the production of the LED light-emitting device, the reflective plate may be sometimes exposed to a high temperature environment during the mounting step of an LED element, the curing step of a sealing resin, and the soldering step at the time of assembling an LED module. Therefore, high heat resistance is required for a resin material which constitutes the reflective plate, and also excellent moldability is required for molding into the reflective plate. Therefore, a liquid crystal polyester composition produced by blending a liquid crystal polyester with a white pigment as a reflectivity imparting agent has been studied as a resin material which constitutes the reflective plate (see, for example, JP-A-2007-320996).

In order to reduce anisotropy and to enhance a weld strength of a molded body constituted from a liquid crystal polyester, it has been widely studied to blend a liquid crystal polyester with a glass fiber. It has also been studied to use, as the glass fiber, those produced by bundling glass fibers using a sizing agent because of inexpensive price and excellent handling properties thereof. For example, JP-A-2000-44793 discloses, as the sizing agent, a sizing agent constituted from a polyurethane including a xylylene diisocyanate unit and a polyester polyol unit.

SUMMARY OF THE INVENTION

When a liquid crystal polyester is blended with a white pigment and is also blended with a glass fiber bundle obtained by bundling glass fibers using the above conventional sizing agent, and then the obtained liquid crystal polyester composition is molded into a reflective plate, the obtained reflective plate may sometimes have an insufficient reflectivity since the sizing agent may cause coloration of the liquid crystal polyester composition. Thus, one of objectives of the present invention is to provide a liquid crystal polyester composition comprising a liquid crystal polyester, a white pigment and a glass fiber bundle, which can provide a reflective plate having a high reflectivity.

In order to achieve the above object, the present invention provides a liquid crystal polyester composition comprising a liquid crystal polyester, a white pigment and a glass fiber bundle obtained by bundling glass fibers using a sizing agent comprising the following polyurethane:

A polyurethane to be used in the present invention is a polyurethane having a polyester polyol unit and at least one of an aliphatic diisocyanate unit or an alicyclic diisocyanate unit, wherein the polyester polyol unit is a polyol unit having an aliphatic polyhydric alcohol unit and at least one of an aliphatic polybasic acid unit or an alicyclic polybasic acid unit.

According to the present invention, a reflective plate which is produced by molding the above liquid crystal polyester composition is also provided. Furthermore, a light-emitting device including the above reflective plate and a light-emitting element is provided.

A reflective plate having a high reflectivity can be obtained by molding the liquid crystal polyester composition of the present invention.

DETAILED DESCRIPTION OF THE INVENTION

A liquid crystal polyester is preferably a liquid crystal polyester which exhibits liquid crystallinity in a molten state, and is melted at a temperature of 450° C. or lower. The liquid crystal polyester may be a liquid crystal polyester amide, a liquid crystal polyester ether, a liquid crystal polyester carbonate, or a liquid crystal polyester imide. The liquid crystal polyester is preferably a wholly aromatic liquid crystal polyester which is prepared by using only an aromatic compound as a raw material monomer.

Typical examples of the liquid crystal polyester include a liquid crystal polyester obtained by polymerizing (polycondensing) an aromatic hydroxycarboxylic acid, an aromatic dicarboxylic acid, and a compound selected from the group consisting of an aromatic diol, an aromatic hydroxyamine and an aromatic diamine; a liquid crystal polyester obtained by polymerizing plural kinds of aromatic hydroxycarboxylic acids; a liquid crystal polyester obtained by polymerizing an aromatic dicarboxylic acid, and a compound selected from the group consisting of an aromatic diol, an aromatic hydroxyamine and an aromatic diamine; and a liquid crystal polyester obtained by polymerizing a polyester such as polyethylene terephthalate, and an aromatic hydroxycarboxylic acid. Herein, in place of a part or all of each of the aromatic hydroxycarboxylic acid, the aromatic dicarboxylic acid, the aromatic diol, the aromatic hydroxyamine and the aromatic diamine, a polycondensable derivative thereof may be used.

Examples of the polycondensable derivative of a compound having a carboxyl group, such as an aromatic hydroxycarboxylic acid or an aromatic dicarboxylic acid, include a polycondensable derivative in which the carboxyl group has been converted into an alkoxycarbonyl group or an aryloxycarbonyl group, a polycondensable derivative in which the carboxyl group has been converted into a haloformyl group, and a polycondensable derivative in which the carboxyl group has been converted into an acyloxycarbonyl group. Examples of the polycondensable derivative of a compound having a hydroxyl group, such as an aromatic hydroxycarboxylic acid, an aromatic diol or an aromatic hydroxylamine, include a polycondensable derivative in which the hydroxyl group has been converted into an acyloxyl group through acylation. Examples of the polycondensable derivative of a compound having an amino group, such as an aromatic hydroxyamine or an aromatic diamine, include a polycondensable derivative in which the amino group has been converted into an acylamino group through acylation.

The liquid crystal polyester is preferably a liquid crystal polyester including a repeating unit represented by the formula (1) shown below (hereinafter may be sometimes referred to as a "repeating unit (1)"), and more preferably a liquid crystal polyester further including a repeating unit represented by the formula (2) shown below (hereinafter may be sometimes referred to as a "repeating unit (2)") and a repeating unit represented by the formula (3) shown below (hereinafter may be sometimes referred to as a "repeating unit (3)"):

  (1)

  (2)

  (3)

wherein $Ar^1$ represents a phenylene group, a naphthylene group or a biphenylylene group, $Ar^2$ and $Ar^3$ each independently represent a phenylene group, a naphthylene group, a biphenylylene group or a group represented by the formula (4) shown below, X and Y each independently represent an oxygen atom or an imino group (—NH—), and hydrogen atoms in the above group represented by $Ar^1$, $Ar^2$ or $Ar^3$ each independently may be substituted with a halogen atom, an alkyl group or an aryl group, and

  (4)

wherein $Ar^4$ and $Ar^5$ each independently represent a phenylene group or a naphthylene group, and Z represents an oxygen atom, a sulfur atom, a carbonyl group, a sulfonyl group or an alkylidene group.

Herein, examples of the halogen atom include a fluorine atom, a chlorine atom and a bromine atom. Examples of the alkyl group include a methyl group, an ethyl group, an n-propyl group, an isopropyl group, an n-butyl group, an isobutyl group, an s-butyl group, a t-butyl group and a 2-ethylhexyl group, and the number of carbon atoms thereof is usually from 1 to 10. Examples of the aryl group include a phenyl group, an o-tolyl group, an m-tolyl group, a p-tolyl group, a 1-naphthyl group and a 2-naphthyl group, and the number of carbon atoms thereof is usually from 6 to 20. Examples of the alkylidene group include a methylene group, an ethylidene group, an isopropylidene group, an n-butylidene group and a 2-ethylhexylidene group, and the number of carbon atoms thereof is usually from 1 to 10.

The repeating unit (1) is a repeating unit derived from an aromatic hydroxycarboxylic acid, and $Ar^1$ is preferably a p-phenylene group (derived from p-hydroxybenzoic acid) or a 2,6-naphthylene group (derived from 6-hydroxy-2-naphthoic acid).

The repeating unit (2) is a repeating unit derived from an aromatic dicarboxylic acid. $Ar^2$ is preferably a p-phenylene group (derived from terephthalic acid), an m-phenylene group (derived from isophthalic acid), a 2,6-naphthylene group (derived from 6-hydroxy-2-naphthoic acid) or a diphenylether-4,4'-diyl group (derived from diphenylether-4,4'-dicarboxylic acid).

The repeating unit (3) is a repeating unit derived from an aromatic diol, an aromatic hydroxylamine or an aromatic diamine, and $Ar^3$ is preferably a p-phenylene group (derived from hydroquinone, p-aminophenol or p-phenylenediamine) or a 4,4'-biphenylylene group (derived from 4,4'-dihydroxybiphenyl, 4-amino-4'-hydroxybiphenyl or 4,4'-diaminobiphenyl).

The content of the repeating unit (1) is preferably 30 mol % or more, more preferably from 30 to 80 mol %, and still more preferably from 40 to 70 mol %, based on the total amount of all repeating units which constitute the liquid crystal polyester (the value of the sum total of an amount (mol) equivalent to the amount of substance of each repeating unit determined by dividing the mass of each repeating unit constituting a liquid crystal polyester by the formula weight of each repeating unit). As the content of the repeating unit (1) increases, liquid crystallinity of the liquid crystal polyester is improved more easily. However, when the content is too high, a melting temperature of the liquid crystal polyester becomes higher and thus it becomes difficult to mold the liquid crystal polyester.

The content of the repeating unit (2) is preferably 35 mol % or less, more preferably from 10 to 35 mol %, and still more preferably from 15 to 30 mol %, based on the total amount of all repeating units which constitute the liquid crystal polyester.

The content of the repeating unit (3) is preferably 35 mol % or less, more preferably from 10 to 35 mol %, and still more preferably from 15 to 30 mol %, based on the total amount of all repeating units which constitute the liquid crystal polyester.

A ratio of the content of the repeating unit (2) to that of the repeating unit (3) is preferably from 0.9/1 to 1/0.9 in terms of [repeating unit (2)]/[repeating unit (3)] (mol/mol) since the molecular weight of the liquid crystal polyester becomes higher easily, thus facilitating enhancement in heat resistance and strength of the liquid crystal polyester.

It is preferred that the repeating unit (3) is a repeating unit in which X and Y are oxygen atoms, that is, a repeating unit derived from an aromatic diol since the viscosity of the liquid crystal polyester upon melting becomes lower easily.

It is preferred that the liquid crystal polyester is produced by melt polymerization of a raw material monomer, followed by solid phase polymerization of the obtained polymer (prepolymer). Whereby, a high-molecular weight liquid crystal polyester having high heat resistance and high strength can be produced with satisfactory operability. The above melt polymerization may be performed in the presence of a catalyst, and examples of the catalyst include metal compounds such as magnesium acetate, stannous acetate, tetrabutyl titanate, lead acetate, sodium acetate, potassium acetate and antimony trioxide; and nitrogen-containing heterocyclic compounds such as N,N-dimethylaminopyridine and N-methylimidazole. Among these catalysts, nitrogen-containing heterocyclic compounds are preferably used.

The flow initiation temperature of the liquid crystal polyester is preferably from 270 to 400° C., and more preferably from 300 to 380° C. As the flow initiation temperature of the liquid crystal polyester becomes higher, heat resistance and strength of the liquid crystal polyester are improved more easily. However, when the flow initiation temperature is too high, a melting temperature of the liquid crystal polyester becomes higher and thus it becomes difficult to mold the liquid crystal polyester.

The flow initiation temperature is also called a flow temperature, and is the temperature at which, when a hot melt of a liquid crystal polyester is extruded through a nozzle of a capillary rheometer measuring 1 mm in inner diameter and 10 mm in length under a load of 9.8 MPa (100 kg/cm$^2$) at a temperature rise rate of 4° C./minute, the melt viscosity exhibits 4,800 Pa·s (48,000 poise). The flow initiation temperature serves as an indicator of the molecular weight of the liquid crystal polyester (see, for example, "Synthesis, Molding and Application of Liquid Crystal Polymer", edited by Naoyuki Koide, p. 95, CMC, issued on Jun. 5, 1987).

The liquid crystal polyester composition of the present invention is produced by blending the above liquid crystal polyester with a white pigment and a glass fiber bundle.

As the white pigment, for example, inorganic compounds such as zinc oxide, zinc sulfide, white lead and titanium oxide are preferably used and, if necessary, two or more kinds of them can also be used. Among these, titanium oxide is preferred.

The particle diameter of the white pigment is preferably from 0.05 to 2 μm, more preferably from 0.1 to 1 μm, still more preferably from 0.15 to 0.5 μm, and particularly preferably from 0.2 to 0.4 μm, in terms of a volume average since the white pigment is easily dispersed in the liquid crystal polyester and a reflective plate having a high reflectivity is easily obtained.

As used herein, a volume average particle diameter is a particle diameter corresponding to 50% cumulative frequency in a distribution curve which is obtained by taking a photograph of a white pigment using a scanning electron microscope (SEM), and analyzing the obtained SEM micrograph using an image analyzer (for example, "Luzex IIIU" manufactured by Nireco Corporation) thereby determining the amount (%) of particles in each particle diameter section of primary particles, followed by cumulation of the amount of particles on volume basis.

The blend amount of the white pigment is preferably from 20 to 200 parts by mass, more preferably from 25 to 150 parts by mass, and still more preferably from 40 to 100 parts by mass, based on 100 parts by mass of the liquid crystal polyester.

The crystal form of titanium oxide, which is a preferred example of the white pigment, may be a rutile type or an anatase type, or both types may coexist. However, a white pigment containing rutile type titanium oxide is preferred and a white pigment composed substantially only of rutile type titanium oxide is more preferred since it is easy to obtain a reflective plate which has a high reflectivity and is also excellent in weatherability.

Titanium oxide may be subjected to a surface treatment. For example, dispersibility and weatherability can be improved by subjecting titanium oxide to the surface treatment using an inorganic metal oxide. It is preferred to use, as the inorganic metal oxide, aluminum oxide (alumina). From the viewpoint of heat resistance and strength, it is preferred to use titanium oxide which has not been subjected to the surface treatment.

The method of producing titanium oxide may be a chlorine method or a sulfuric acid method. When rutile type titanium oxide is to be produced, the chlorine method is preferred. When titanium oxide is produced by the chlorine method, first, ore (synthetic rutile ore obtained from rutile ore or ilmenite ore) as a titanium source is reacted with chlorine at about 1,000° C. to obtain crude titanium tetrachloride, and this crude titanium tetrachloride is preferably purified by rectification and then oxidized with oxygen.

Examples of commercially available products of titanium oxide produced by the chlorine method include "TIPAQUE CR-60" and "TIPAQUE CR-58" manufactured by ISHIHARA SANGYO KAISHA, LTD. Examples of commercially available products of titanium oxide produced by the sulfuric acid method include "TITANIX JR-301" and "WP0042" manufactured by TAYCA Co., Ltd., and "SR-1", "SR-1R" and "D-2378" manufactured by Sakai Chemical Industry Co., Ltd.

A glass fiber bundle to be used in the present invention may be a glass fiber bundle which can be obtained by bundling glass fibers using a sizing agent comprising a polyurethane. The polyurethane to provide the sizing agent may comprises a polyurethane having a polyester polyol unit and at least one of an aliphatic diisocyanate unit or an alicyclic diisocyanate unit, wherein the polyester polyol unit is a polyol unit having an aliphatic polyhydric alcohol unit and at least one of an aliphatic polybasic acid unit or an alicyclic polybasic acid unit. By utilizing such a glass fiber bundle, it is possible to obtain a liquid crystal polyester composition which can provide a reflective plate having a high reflectivity.

One of preferable examples of glass fiber is E glass. An average fiber diameter of the glass fiber (glass filament) is preferably from 4 to 23 μm, and more preferably from 4 to 16 μm. When the average fiber diameter of the glass fiber is too small, the impact strength of the reflective plate is likely to decrease. In contrast, when the average fiber diameter is too large, stress at the end face portion of the glass fiber becomes larger in the reflective plate, and thus the tensile strength and bending strength of the reflective plate are likely to decrease.

The glass fiber is preferably subjected to a surface treatment with a silane compound. Examples of the silane compound include aminosilane compounds such as γ-aminopropyltriethoxysilane, N-β-(aminoethyl)-γ-aminopropyltrimethoxysilane, N-β-(aminoethyl)-N'-β-(aminoethyl)-γ-aminopropyltriethoxysilane and γ-anilinopropyltrimethoxysilane; epoxysilane compounds such as γ-glycidoxypropyltrimethoxysilane and β-(3,4-epoxycyclohexyl)ethyltrimethoxysilane; vinylsilane compounds such as vinyltrimethoxysilane and N-β-(N-vinylbenzylaminoethyl)-γ-aminopropyltrimethoxysilane; γ-methacryloxypropyltrimethoxysilane, γ-chloropropyltrimethoxysilane, and γ-mercaptopropyltrimethoxysilane. If necessary, two or more kinds of them may be used. Among these, epoxysilane compounds are preferably used from the viewpoint of color tone of the reflective plate.

Examples of the aliphatic diisocyanate from which the aliphatic diisocyanate unit is derived include ethylene diisocyanate, hexamethylene diisocyanate (HDI) and lysin diisocyanate. If necessary, two or more kinds of them may be used. Among these, HDI is preferred. Examples of the alicyclic diisocyanate from which the alicyclic diisocyanate unit is derived include isophorone diisocyanate (IPDI) and 4,4'-dicyclohexylmethane diisocyanate. If necessary, two or more kinds of them may be used. Among these, IPDI is preferred.

Examples of the aliphatic polybasic acid from which the aliphatic polybasic acid unit is derived include succinic acid, glutaric acid, adipic acid, pimelic acid, suberic acid, azelaic acid, sebacic acid, nonanedicarboxylic acid, dodecanedicarboxylic acid, maleic acid and fumaric acid. If necessary, two or more kinds of them may be used. Examples of the alicyclic polybasic acid from which the alicyclic polybasic acid unit is derived include 1,3-cyclopentanedicarboxylic acid and 1,4-cyclohexanedicarboxylic acid. If necessary, two or more kinds of them may be used.

Examples of the aliphatic polyhydric alcohol from which the aliphatic polyhydric alcohol unit is derived include ethylene glycol, propylene glycol, 1,3-propanediol, butylene glycol, 1,4-butanediol, 1,5-pentanediol, hexylene glycol, glycerin, trimethylolpropane, trimethylolethane, pentaerythrol, diethylene glycol, triethylene glycol, tetraethylene glycol, polyethylene glycol and dipropylene glycol. If necessary, two or more kinds of them may be used. Among these, an aliphatic polyhydric alcohol having an aliphatic chain of 4 to 12 carbon atoms is preferred since it is excellent in bundling properties of glass fibers.

Preferred examples of the polyester polyol include polyethylene adipate diol, polybutylene adipate diol, polyethylenebutylene adipate diol and polyneopentyl adipate diol. If necessary, two or more kinds of them may be used. The number average molecular weight of the polyester polyol is usually from 500 to 6,000, and preferably from 800 to 3,000.

Examples of commercially available products of the polyester polyol include "Kuraray Polyol P-2012", "Kuraray Polyol P-2011" and "Kuraray Polyol P-2050" manufactured by Kuraray Co., Ltd.

The polyester polyol can be produced by dehydration polycondensation of an aliphatic polybasic acid and/or an alicyclic polybasic acid and an aliphatic polyhydric alcohol. The polyurethane can be produced by polyaddition of an aliphatic diisocyanate and/or an alicyclic diisocyanate and a polyester polyol. When producing the polyester polyol, if necessary, aromatic polybasic acids such as terephthalic acid, isophthalic acid, phthalic acid, 1,4-naphthalenedicarboxylic acid, biphenyldicarboxylic acid and trimellitic acid may be used as the polybasic acid, together with an aliphatic polybasic acid and/or an alicyclic polybasic acid.

The sizing agent may contain a fluorescent whitening agent from the viewpoint of color tone of the reflective plate. Examples of the fluorescent whitening agent include benzoxazole-based, triazole-based, coumarin-based, pyrazoline-based, styryl-based and naphthalimide-based fluorescent whitening agents. The fluorescent whitening agent is preferably contained in the sizing agent in the proportion of 0.001 to 0.1 parts by mass based on 100 parts by mass of the glass fiber bundle from the viewpoint of color tone of the reflective plate. If necessary, the sizing agent may contain a component such as an antistatic agent.

The glass fiber bundle obtained by bundling glass fibers using a sizing agent preferably includes 100 to 4,000 glass fibers, and more preferably 800 to 3,000 glass fibers in one bundle.

The content of the sizing agent in the glass fiber bundle is preferably from 0.05 to 0.4% by mass, and more preferably from 0.05 to 0.29% by mass, based on the glass fiber bundle. When the content of the sizing agent in the glass fiber bundle is too small, bundling properties of the glass fiber bundle may become insufficient and when producing a reflective plate, split yarn or fluffing is likely to arise and workability is likely to be deteriorated. In contrast, when the content of the sizing agent in the glass fiber bundle is too large, a gas is likely to be generated when producing a reflective plate. Also, blister is likely to arise in the reflective plate and thus mechanical properties of the reflective plate are likely to deteriorate.

The blend amount of the glass fiber bundle is preferably from 5 to 200 parts by mass, and more preferably from 10 to 150 parts by mass, based on 100 parts by mass of the liquid crystal polyester.

The glass fiber bundle to be blended with the liquid crystal polyester is usually obtained as a glass chopped strand obtained by cutting a glass strand.

It is preferred that the liquid crystal polyester composition of the present invention is produced by kneading a liquid crystal polyester, a white pigment and a glass fiber bundle at 250° C. or higher. The kneading temperature is more preferably 280° C. or higher, and usually 400° C. or lower, preferably 380° C. or lower.

A reflective plate having a high reflectivity can be produced by molding the thus obtained liquid crystal polyester of the present invention. The molding method is preferably a melt molding method such as an injection molding method, an injection compression molding method or an extrusion molding method, and more preferably an injection molding method. The injection molding method facilitates the production of a reflective plate including a thin wall portion and a reflective plate having a complicated shape. The injection molding method is particularly suited for the production of a small-sized reflective plate in which the thickness of the thin wall portion is from 0.01 mm to 3.0 mm, preferably from 0.02 to 2.0 mm, and more preferably from 0.05 to 1.0 mm.

In the thus obtained reflective plate of the present invention, a diffuse reflectivity for light having a wavelength of 460 nm is preferably 70% or more, and more preferably 80% or more. As used herein, the reflectivity is determined based on the total light reflectivity measuring method A (standard white board: barium sulfate) defined in JIS K7105-1981.

The reflective plate of the present invention is suitably used as a reflection member for light reflection, particularly visible light reflection, in the fields of electric, electronics, automobiles, machines and the like. For example, the reflective plate is suitably used as a lamp reflector of light source devices such as a halogen lamp and an HID lamp; and a reflective plate of a light-emitting device and a display device using light-emitting elements such as an LED and organic EL. The reflective plate is used particularly suitably as a reflective plate of a light-emitting device using a light-emitting diode (LED).

The invention being thus described, it will be apparent that the same may be varied in many ways. Such variations are to be regarded as within the spirit and scope of the invention, and all such modifications as would be apparent to one skilled in the art are intended to be within the scope of the following claims.

EXAMPLES

The present invention is described in more detail by following Examples, which should not be construed as a limitation upon the scope of the present invention.

Examples 1 to 6 and Comparative Examples 1 and 2

Liquid Crystal Polyester (1):

In a reactor equipped with a stirrer, a torque meter, a nitrogen gas introducing tube, a thermometer and a reflux condenser, 994.5 g (7.2 mol) of p-hydroxybenzoic acid, 446.9 g (2.4 mol) of 4,4'-dihydroxybiphenyl, 299.0 g (1.8 mol) of terephthalic acid, 99.7 g (0.6 mol) of isophthalic acid and 1347.6 g (13.2 mol) of acetic anhydride were charged and 0.2 g of 1-methylimidazole was added. After sufficiently replacing the atmosphere inside the reactor by a nitrogen gas, the temperature was raised to 150° C. over 30 minutes under a nitrogen gas flow and the mixture was refluxed for 1 hour while maintaining the same temperature. Thereafter, 0.9 g of 1-methylimidazole was added and the temperature was raised to 320° C. over 2 hours and 50 minutes while distilling off the by-produced acetic acid and unreacted acetic anhydride. At the time when an increase in torque was recognized, contents were taken out and cooled to room temperature. The obtained solid matter was crushed by a coarse crusher. After the temperature was raised to 250° C. from room temperature over 1 hour under a nitrogen atmosphere, the temperature was raised to 285° C. from 250° C. over 5 hours and then solid phase polymerization was performed by maintaining the temperature at 285° C. for 3 hours. The flow initiation temperature of the thus obtained liquid crystal polyester (1) was 327° C.

Liquid Crystal Polyester (2):

In a reactor equipped with a stirrer, a torque meter, a nitrogen gas introducing tube, a thermometer and a reflux condenser, 994.5 g (7.2 mol) of p-hydroxybenzoic acid, 299.0 g (1.8 mol) of terephthalic acid, 99.7 g (0.6 mol) of isophthalic acid, 446.9 g (2.4 mol) of 4,4'-dihydroxybiphenyl, 1298.6 g (12.7 mol) of acetic anhydride and 0.2 g of 1-methylimidazole were charged. After replacing the atmosphere inside the reactor by a nitrogen gas, the temperature was raised to 150° C. from room temperature over 30 minutes under a nitrogen gas flow while stirring and the mixture was refluxed for 1 hour. Then, 0.9 g of 1-methylimidazole was added and the temperature was raised to 320° C. from 150° C. over 2 hours and 50 minutes while distilling off the by-produced acetic acid and unreacted acetic anhydride. At the time when an increase in torque was recognized, contents were taken out and cooled to room temperature. The obtained solid matter was crushed by a crusher. The temperature was raised to 230° C. from room temperature over 1 hour under a nitrogen atmosphere, the temperature was raised to 260° C. from 230° C. over 2 hours and then solid phase polymerization was performed by maintaining the temperature at 260° C. for 10 hours. The flow initiation temperature of the thus obtained liquid crystal polyester (2) was 300° C.

White Pigment (1):

As a white pigment (1), "TIPAQUE CR-58" (a product obtained by subjecting titanium oxide produced by a chlorine method to an alumina surface treatment, volume average particle diameter: 0.28 μm) manufactured by ISHIHARA SANGYO KAISHA, LTD. was used.

White Pigment (2):

As a white pigment (2), "TIPAQUE PF-740" (a product obtained by subjecting titanium oxide produced by a chlorine method to an alumina surface treatment, volume average particle diameter: 0.25 μm) manufactured by ISHIHARA SANGYO KAISHA, LTD. was used.

Talc

Talc X-50 (a plate-like filler, center particle diameter: 14.5 μm) manufactured by NIPPON TALC Co., Ltd. was used.

Glass Fiber Bundles (1) to (3):

A polyurethane was obtained from isophorone diisocyanate, and a polyester polyol obtained from adipic acid, phthalic acid and 3-methyl-1,5-pentanediol. Using this polyurethane, E glass having an average fiber diameter of 10 μm subjected to a surface treatment with an epoxysilane compound was bundled so that the content of polyurethane in a glass fiber bundle became 0.12% by mass (glass fiber bundle (1)), 0.15% by mass (glass fiber bundle (2)) or 0.19% by mass (glass fiber bundle (3)) to obtain a strand, which was then cut into pieces of 3 mm in length, dried and chopped to obtain glass fiber bundles (1) to (3).

Glass Fiber Bundle (4):

A polyurethane was obtained from xylylene diisocyanate, and a polyester polyol obtained from caprolactone. Using this polyurethane, E glass having an average fiber diameter of 10 μm subjected to a surface treatment with an aminosilane compound was bundled so that the content of polyurethane in a glass fiber bundle became 0.20% by mass to obtain a strand, which was then cut into pieces of 3 mm in length, dried and chopped to obtain a glass fiber bundle (4).

Glass Fiber Bundle (5):

A polyurethane was obtained from isophorone diisocyanate, and a polyester polyol obtained from caprolactone, phthalic acid and neopentyl glycol. Using this polyurethane, E glass having an average fiber diameter of 10 μm subjected to a surface treatment with an aminosilane compound was bundled so that the content of polyurethane in a glass fiber bundle became 0.20% by mass to obtain a strand, which was then cut into pieces of 3 mm in length, dried and chopped to obtain a glass fiber bundle (5).

Liquid Crystal Polyester Composition:

Examples 1 to 3 and Comparative Examples 1 and 2

After 100 parts by mass of the liquid crystal polyester (1) was blended with 55 parts by mass of the white pigment (1) and 27 parts by mass of the glass fiber bundle shown in Table 1, the mixture was kneaded at 320° C. using a twin-screw extruder ("PCM-30", manufactured by Ikegai Iron Works, Ltd.) to obtain a liquid crystal polyester composition.

Examples 4 to 6

After 100 parts by mass of the liquid crystal polyester (2) was blended with the white pigment (2), a glass fiber bundle and talc in the blend amounts shown in Table 2, the mixture was kneaded at 280° C. using a twin-screw extruder ("PCM-30", manufactured by Ikegai Iron Works, Ltd.) to obtain a liquid crystal polyester composition.

Reflective Plate

Using an injection molding machine ("Model PS40E5ASE", manufactured by Nissei Plastic Industrial Co., Ltd.), the obtained liquid crystal polyester composition was injected into a mirror finished mold at 340° C. to obtain a specimen of a reflective plate with a dimension of 64 mm×64 mm×1 mm. Using an automatic recording spectrophotometer ("U-3500, manufactured by Hitachi, Ltd.), a diffuse reflectivity for light having a wavelength of 460 nm was measured for a surface of this specimen based on the total light reflectivity measuring method A (standard white board: barium sulfate) defined in JIS K7105-1981. The results are shown in Table 1 and Table 2. This diffuse reflectivity is a relative value assuming that the diffuse reflectivity of a standard white board of barium sulfate is 100%.

TABLE 1

|  |  | Example 1 | Example 2 | Example 3 | Comparative Example 1 | Comparative Example 2 |
| --- | --- | --- | --- | --- | --- | --- |
| Kind of glass fiber bundle |  | (1) | (2) | (3) | (4) | (5) |
| Units in polyurethane | Isophorone diisocyanate | ○ | ○ | ○ |  | ○ |
|  | Xylylene diisocyanate |  |  |  | ○ |  |
|  | Caprolactone |  |  |  | ○ | ○ |
|  | Adipic acid | ○ | ○ | ○ |  |  |
|  | Phthalic acid | ○ | ○ | ○ |  | ○ |
|  | 3-Methyl-1,5-pentanediol | ○ | ○ | ○ |  |  |
|  | Neopentyl glycol |  |  |  |  | ○ |
| Content of polyurethane in glass fiber bundle (%) |  | 0.12 | 0.15 | 0.19 | 0.20 | 0.20 |
| Diffuse reflectivity of reflective plate (%) |  | 86.6 | 86.6 | 86.5 | 85.2 | 86.0 |

TABLE 2

|  | | Example 4 | Example 5 | Example 6 |
|---|---|---|---|---|
| Kind of glass fiber bundle | | (2) | (2) | (2) |
| Glass fiber bundle | Parts by mass | 30 | 20 | 13 |
| Titanium oxide (2) | | 70 | 80 | 125 |
| Talc | | | | 13 |
| Diffuse reflectivity of reflective plate (%) | | 89.8 | 90.4 | 91.5 |

What is claimed is:

1. A liquid crystal polyester composition comprising a liquid crystal polyester, a white pigment and a glass fiber bundle obtained by bundling glass fibers using a sizing agent comprising a polyurethane having a polyester polyol unit and at least one of an aliphatic diisocyanate unit or an alicyclic diisocyanate unit, wherein the polyester polyol unit is a polyol unit having an aliphatic polyhydric alcohol unit and at least one of an aliphatic polybasic acid unit or an alicyclic polybasic acid unit.

2. The liquid crystal polyester composition according to claim 1, wherein the amount of the white pigment in the composition is in the range of from 20 to 200 parts by mass based on 100 parts by mass of the liquid crystal polyester.

3. The liquid crystal polyester composition according to claim 1, wherein the amount of the glass fiber bundle in the composition is in the range of from 5 to 200 parts by mass based on 100 parts by mass of the liquid crystal polyester.

4. The liquid crystal polyester composition according to claim 1, wherein the aliphatic polyhydric alcohol unit is a unit having an aliphatic chain of 4 to 12 carbon atoms.

5. The liquid crystal polyester composition according to claim 1, which is obtained by kneading the liquid crystal polyester, the white pigment and the glass fiber bundle at a temperature of 250° C. or higher.

6. The liquid crystal polyester composition according to claim 1, wherein the content of the sizing agent in the glass fiber bundle is in the range of from 0.05 to 0.4% by mass based on the glass fiber bundle.

7. The liquid crystal polyester composition according to claim 1, wherein the glass fiber is surface-treated with a silane compound.

8. The liquid crystal polyester composition according to claim 7, wherein the silane compound is an epoxysilane compound.

9. A reflective plate obtained by molding the liquid crystal polyester composition according to claim 1.

10. The reflective plate according to claim 9, wherein a diffuse reflectivity for light having a wavelength of 460 nm based on the total light reflectivity measuring method A (standard white board: barium sulfate) defined in JIS K7105-1981 of the reflective plate is 70% or more.

11. A light-emitting device comprising the reflective plate according to claim 9 and a light-emitting element.

12. The light-emitting device according to claim 11, wherein the light-emitting element is a light-emitting diode.

* * * * *